United States Patent [19]

Jespersen

[11] 4,213,062
[45] Jul. 15, 1980

[54] METHOD AND APPARATUS FOR PRESCRIBING A TIME OF DAY

[75] Inventor: Aksel Jespersen, Sonderborg, Denmark

[73] Assignee: Danfoss A/S, Nordborg, Denmark

[21] Appl. No.: 895,444

[22] Filed: Apr. 11, 1978

[30] Foreign Application Priority Data

Apr. 14, 1977 [DE] Fed. Rep. of Germany ....... 2716517

[51] Int. Cl.² .................... H01H 43/00; H01H 35/00
[52] U.S. Cl. .................................... 307/117; 315/150
[58] Field of Search ...................... 328/139; 307/117; 315/149, 150, 159; 340/601; 364/569; 235/92 T, 92 TF; 200/38 DA

[56] References Cited

U.S. PATENT DOCUMENTS

| 3,350,581 | 10/1967 | Stein | 307/117 |
| 3,428,861 | 2/1969 | Zinsmeyer | 315/159 |
| 3,555,214 | 1/1971 | Lee | 200/38 DA |

OTHER PUBLICATIONS

Hagerstown Town & Country Almanack for 1978, Gruber Almanack Co., Hagerston, Md., copyright, 1977.

Primary Examiner—L. T. Hix
Assistant Examiner—James L. Dwyer
Attorney, Agent, or Firm—Wayne B. Easton

[57] ABSTRACT

The invention relates to electrical apparatus for indicating one or more prescribed times of day which occur between the hours of sunset and sunrise. The apparatus is photosensitive and operates in a manner so that the selected prescribed times are determined each day by utilizing detected sunrise and sunset times as the basis for the determination. This determination on a daily basis avoids accumulation errors which occur when the determination is on a cyclical basis as with the use of a clock.

4 Claims, 4 Drawing Figures

METHOD AND APPARATUS FOR PRESCRIBING A TIME OF DAY

The invention relates to a method of prescribing a time of day, particularly the commencement or end of night reduction in heating installations, and to an apparatus for performing this method.

To prescribe the commencement and end of the night reduction, it is known to use switching clocks which are driven continuously. In the course of time, there can be considerable fluctuations of the switching time from the time as originally set. As a rule one uses electrically operated time switches in which no clockwork has to be wound up. Interruptions in the current supply, whether they be internal such as when a fuse burns out or external such as when there is a mains cut-out, lead to standstill periods which can add up to considerable wrong periods in the course of time. It is not usual for the time switch to be reset because the owner may lack the required technical knowledge or because one forgets to effect regular resetting, and thus one is left with permanent errors.

The invention is therefore based on the problem of providing means for preventing permanent errors in prescribing the time of day.

This problem is solved according to the invention in that the times of sunrise and sunset are measured, noon is obtained by halving the time difference and a fixed time interval is added thereto.

When proceeding in this manner, one prescribes the time of day by the end of the fixed time interval. Since this starts from a reference point which can be re-established daily, one obtains a relatively high degree of accuracy which is well within tolerable limits for control apparatus of the type for which the invention is intended. Errors in time cannot be cumulative; errors occurring on one day are automatically corrected on the following day.

With particular advantage one makes provision for a constant to be determined between sunrise and sunset and after sunset twice the constant is integrated with respect to time and the instant is determined when the integral exceeds a limiting value corresponding to the fixed time interval. The first section of the integration combines the steps of forming and halving the time difference as well as adding that part of the fixed time interval that has transpired up to sunset, thereby giving a very simple manner of operation.

An apparatus for performing this method is characterised according to the invention by a control circuit with a photo-electric sensor giving a first control signal between sunrise and sunset and a second control signal between sunset and sunrise, by an integrator which integrates the constant with respect to time under the influence of the first control signal and twice the constant under the influence of the second control signal, and by a comparator which responds when the output of the integrator exceeds the limiting value corresponding to the fixed time interval. Accordingly, comparatively simple components will suffice to perform the method.

It is particularly favorable if the integrator is a binary counter fed with beat pulses, that a beat pulse generator feeds the binary counter with beat pulses of predetermined frequency under the influence of the first control signal and with beat pulses of double the frequency under the influence of the second control signal, and that a resetting device is provided which sets the binary counter back to zero before commencement of counting. The binary counter therefore starts to count from zero, slowly at sunrise and more rapidly after sunset. The counter output can then be compared with a selected limiting value.

In particular, the beat pulse generator can be energised by AC mains voltage from which beat pulses of mains frequency and double the mains frequency are derived. For this purpose it is merely necessary to transform every second or every half wave of the mains voltage into a beat pulse.

For example, the beat pulses may be constantly available at two outputs of the beat generator and the outputs may be connected to the binary counter by way of a respective gate circuit influenced by the first and second control signal, respectively.

In a further development, the first and second control signals can be formed by two different voltage levels and the resetting device may comprise a differentiating condenser enabling a resetting signal to be produced on transition from the second to the first control signal. This resetting signal then occurs at sunrise, i.e. directly upon commencement of the new counting period.

Further, it is recommended that two comparators be connected to the output of the integrator, the first being associated with commencement of the night reduction and the second with the end of night reduction. To prescribe two times of day a single integrator will therefore suffice.

Further, the binary counter can be followed by a digital analogue converter of which the analogue output voltage can be fed to the one input of the comparator, the other input having an adjustable limiting voltage applied to it. A simple differential amplifier may serve as the comparator, in which the instance of response is indicated by the change in output potential.

It is favorable for the analogue output voltage to be connected to the positive input of the one comparator and to the negative output of the other and for both comparators to act through a respective AND or OR circuit on a common setting circuit. The night reduction period is then determined depending on whether the same output signal occurs at both comparators.

The invention will now be described in more detail with reference to the drawing, in which.

Figure 1:
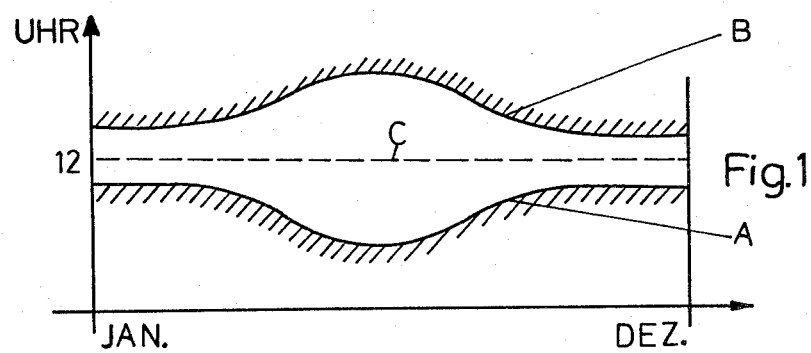
FIG. 1 is a diagram showing the yearly course of sunrise and sunset.
Figure 2:
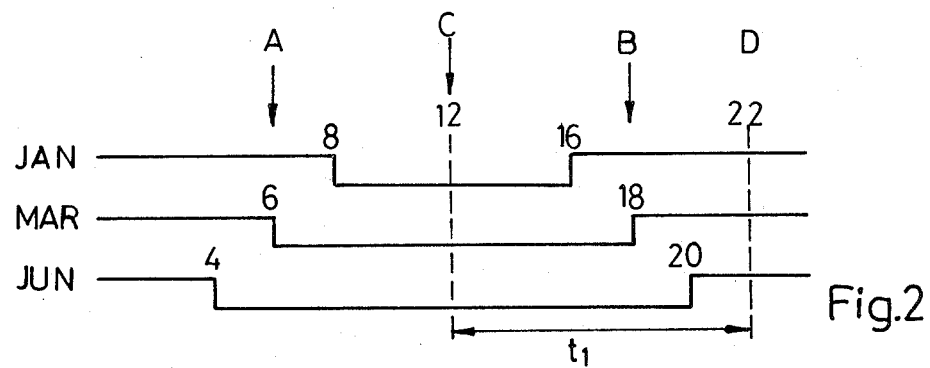
FIG. 2 shows the different time intervals between sunrise and sunset during different months of the year.

In FIG. 1, the time of sunrise over the course of a year, i.e. between January and December, is shown along a curve A and the time of sunset along a curve B. Exactly centrally between these two curves there is the noon line C. It will be seen from FIG. 2 that sunrise in January is at about 0800 hours, about 0600 hours in March and about 0400 hours in June whereas sunset varies from about 1600 hours to 2000 hours. The raised part of the individual curves therefore indicates night time and the depressed part of the individual curves indicates day time. In all cases the noon line C lies accurately halfway between sunrise and sunset.

According to the invention, this noon point is determined and a fixed time interval t1 is added to it. In this way one arrives at the time of day D, in the present case 2200 hours, at which for example the night reduction in a heating installation can take place.

Figure 3:
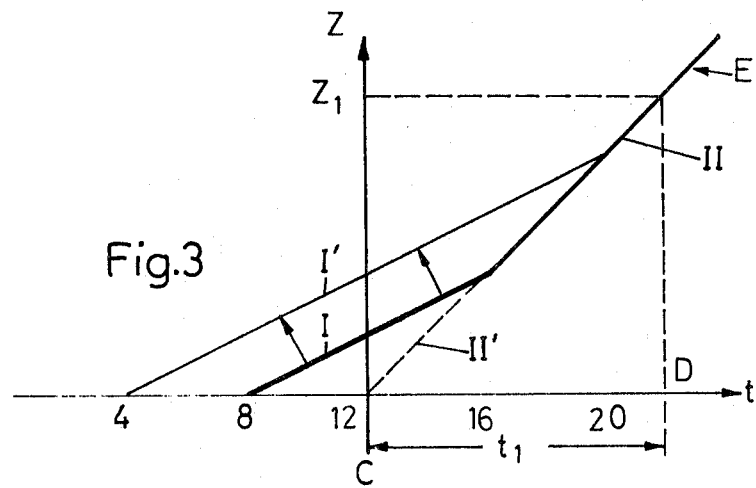
FIG. 3 is a diagram showing the output value of an integrator according to the invention with respect to time.

FIG. 3 shows an integration value Z with respect to time. The hours of the day are again given along the time curve. The origin of the coordination system is at the noon point C. The time of day D is spaced therefrom by the fixed time interval t1. This point is reached when the full line E has reached a predetermined integration value Z1.

The line E consists of two sections. The section I corresponds to the integration of a constant between sunrise and sunset. The section II corresponds to the integration of double the constant after sunset. The section I corresponds to operation in January; it can extend up to the position I' corresponding to operation in June. In all cases the time of day D is reached at the integration value Z1. This is understandable because the integrator has, during operation along the section I between sunrise and sunset, reached the same integration value that it would reach during imaginary operation along the broken section II', i.e. during an integration with twice the speed from noon.

Figure 4:
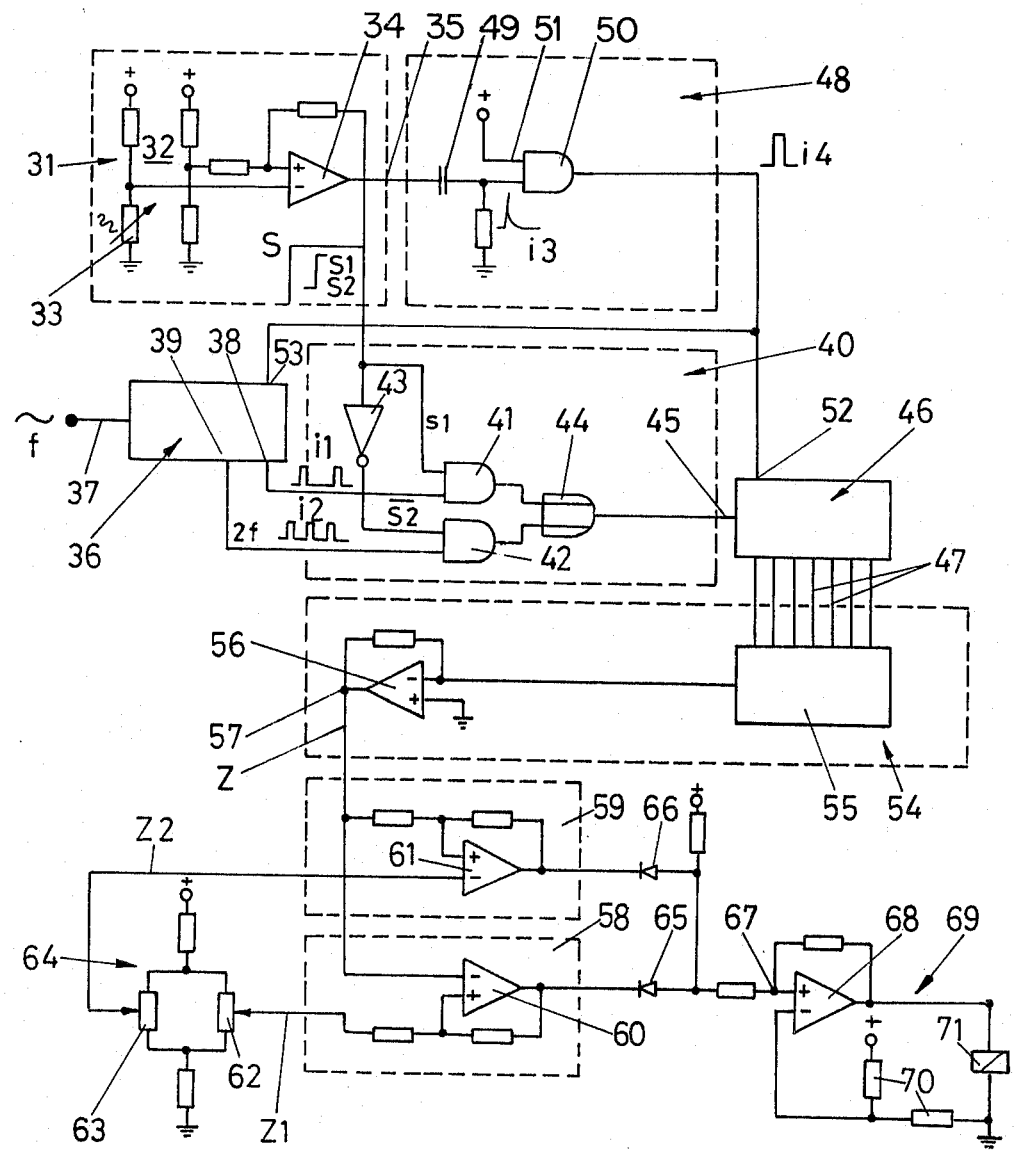
FIG. 4 is a circuit diagram for an apparatus according to the invention.

In the embodiment according to FIG. 4 a control circuit 31 is provided comprising a bridge 32 with a photo-electric sensor 33. This detects the change in brightness at sunrise and sunset, whereby the bridge balance is altered. The diagonal voltage is fed to a trigger amplifier 34 at the output 35 of which control signals s occur, namely a first control signal s1 of higher voltage level during daytime and a second control signal s2 of lower voltage level during night time.

A beat generator 36 has its input 37 applied to AC mains voltage of frequency s=50 Hz. Beat pulses i1 of frequency f will then occur at the first output 38 and beat pulses i2 of frequency 2f will occur at the second output 39.

A signal processing circuit 40 comprises an AND circuit 41 of which the one input is fed with the beat pulses i1 and the other input with the first control signal s1, as well as a second AND circuit 42 of which the one input is fed with the beat pulses i2 and the other input is fed with the inverted second control signal $\overline{s2}$ with the aid of a NOT element 43. The outputs of the two AND circuits are fed by way of an OR circuit 44 to an output 45.

This output 45 coincides with the input of a binary counter 46 which is therefore fed with the beat pulses i1 between sunrise and sunset and with the beat pulses i2 between sunset and sunrise. The conditions at the counter outputs 47 correspond to the content of the counter.

A resetting device 48 comprises a differentiating condenser 49 connected to the output 35 of the trigger amplifier 34. A pulse i3 therefore occurs at same when there is a change from the second control signal s2 to the first control signal s1. The pulse i3 is applied to the one input of an AND circuit 50 of which the other input 51 is fed with positive voltage. Consequently one obtains a resetting pulse i4 which is fed at sunrise to a resetting input 52 of the binary counter 46 as well as to a resetting input 53 of the beat pulse generator 36.

A digital-analogue converter 54 is connected to the counter outputs 47. It comprises appropriate circuitry 55 and an analogue amplifier 56. An integration value analogue signal Z corresponding to the state of the counter occurs at its output 57.

This signal Z is fed to two comparators 58 and 59 each comprising a differential amplifier 60 or 61 with positive feedback. The analogue signal Z occurs at the negative input of the differential amplifier 60 and at the positive input of the differential amplifier 61. The respective other inputs have applied to them a fixed limiting voltage Z1 or Z2 which can be tapped from respective potentiometers 62 and 63 of an adjusting device 64.

The outputs of both comparators 58 and 59 are connected by a respective diode 65 or 66 forming an OR circuit to the positive input 67 of a trigger amplifier 68 of a setting circuit 69. The negative input is fed with a fixed partial voltage with the aid of a voltage divider 70. The output voltage of the trigger amplifier 68 controls a relay 71 which, when energised, characterises the time of night reduction and adjusts, for example, a valve.

This circuit works according to FIG. 3. Between sunrise and sunset the binary counter 46 is continuously fed with pulses i1 of frequency f (Section I). After sunset the binary counter receives the beat pulses i2 of frequency 2f (Section II). When the integration value Z1 has been reached, the comparator 58 responds and on reaching the integration value Z2 the comparator 59 responds. Since the amplifiers 60 and 61 are operated in opposite senses, the relay 71 is energised between the two times of response.

The illustrated logic circuits may be constructed in an equivalent manner. Other integrators can be used instead of the binary counter, for example motors.

I claim:

1. Apparatus for indicating a prescribed time of day, comprising, photosensitive means for detecting a daylight period beginning with sunrise and ending with sunset, said photosensitive means having a daylight output signal indicating the existence of said daylight period and a night-time output signal indicating the night-time period, signal generating means responsive to said daylight and night-time signals for generating a first signal of a predetermining magnitude for said daylight period and a second signal of twice said magnitude for said night-time period, integrating means for sequentially integrating said first and second signals and outputting a corresponding summation signal, comparator means connected to the output of said integrating means and being adjustable to a value to be compared which exceeds the expected summation value of said first signal and corresponds to a selected prescribed time of day, and resetting means responsive to the initiation of said daylight signal for resetting said integrating means at sunrise.

2. Apparatus according to claim 1 wherein said signal generating means is a pulse generator with said first and second signals thereof having frequency characteristics and said second signal having double the frequency of said first signal, said integrating means being a binary counter.

3. Apparatus according to claim 2 wherein said resetting means includes a differentiating capacitor which outputs a reset signal upon the transition of said night-time output signal to said daylight output signal.

4. Apparatus according to claim 1 wherein said comparator means includes two comparator devices to provide for two different prescribed times of day to be selected.

* * * * *